(12) United States Patent
Jutila et al.

(10) Patent No.: US 7,052,220 B1
(45) Date of Patent: May 30, 2006

(54) COMPONENT MOUNTING ASSEMBLY

(75) Inventors: Brian J. Jutila, Richmond, MI (US);
Brian D. Van Buren, Sterling Heights, MI (US); Dennis Sienkiewicz, Dearborn, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 11/047,314

(22) Filed: Jan. 31, 2005

(51) Int. Cl.
*B60P 7/08* (2006.01)

(52) U.S. Cl. ...................................... 410/115; 410/104

(58) Field of Classification Search .................... 410/8, 410/102, 104–106, 110, 115, 116; 248/499
See application file for complete search history.

(56) References Cited

U.S. PATENT DOCUMENTS

| | | | |
|---|---|---|---|
| 3,353,780 A | * | 11/1967 | Young ........................ 410/104 |
| 3,850,113 A | * | 11/1974 | Sichak ........................ 410/104 |
| 5,674,033 A | * | 10/1997 | Ruegg ........................ 410/104 |
| 6,811,345 B1 | | 11/2004 | Jackson |

* cited by examiner

*Primary Examiner*—Stephen Gordon
(74) *Attorney, Agent, or Firm*—Laura C. Hargitt

(57) ABSTRACT

An assembly adapted to be releasably attached to a mounting surface on a body panel of an automotive vehicle for mounting at least one component thereto includes at least one elongated rail member having a base portion that includes a first side adapted to be located adjacent to the mounting surface and an opposed second side. The rail member includes a pair of spaced apart flanges extending outwardly from the second side of the base portion. The base portion includes at least one aperture extending therethrough. The assembly also includes at least one fastening member that is adapted to be retained in the body panel by a retaining feature. The fastening member includes a backing plate portion having at least one flange extending therefrom and an aperture extending therethrough for receiving a fastener for releasably attaching the assembly to the mounting surface.

16 Claims, 3 Drawing Sheets

COMPONENT MOUNTING ASSEMBLY

BACKGROUND OF THE INVENTION

The present invention relates generally to mounting assemblies and, in particular, to an assembly adapted to be releasably attached to a mounting surface on a body panel of an automotive vehicle for mounting at least one component thereto.

It is common in vehicles to provide a location to stow cargo and/or mount attachments thereto. Cargo hooks, cargo clips, bag hooks are all well known for storage locations. Occasionally, a more robust connection is desired. Such a connection can include a rail member attached to a body panel of the vehicle by a plurality of bolts or screws. Prior art rails, however have been attached to the body panel by welding a backing plate on to the body panel to eliminate any possibility of turning while the bolt or screw is being tightened. Welding the backing plate to the body panel, however, is disadvantageously costly, labor intensive and is not user friendly for installation, service, or repair.

It is desirable, therefore, to provide an assembly for mounting at least one component thereto that is cost and labor effective and user friendly for installation, service or repair.

SUMMARY OF THE INVENTION

The present invention concerns an assembly adapted to be releasably attached to a mounting surface on a body panel of an automotive vehicle for mounting at least one component thereto. The assembly includes at least one elongated rail member having a base portion that includes a first side adapted to be located adjacent to the mounting surface and an opposed second side. The rail member includes a pair of spaced apart flanges extending outwardly from the second side of the base portion. The base portion includes at least one aperture extending therethrough. The assembly also includes at least one fastening member that is adapted to be retained in the body panel by a retaining feature. The fastening member includes a backing plate portion having at least one flange extending therefrom and an aperture extending therethrough for receiving a fastener for releasably attaching the assembly to the mounting surface.

The assembly in accordance with the present invention preferably attaches to the body panel by utilizing existing indentation or slots formed in the body panel. The rail member preferably attaches at three places along the entire length of the rail. The fastening member eliminates any need to have any backing plates or welded on plates/nuts for installation. The assembly also allows the customer to add this entire feature even if the original product was not ordered with it. The backing plate of the fastening member becomes a solid pillar when engaged with the rail to form a solid joint. The rail member utilizes a dual track system that allows a plurality of attachments to bypass each other while in use.

The present invention provides an assembly that eliminates mass, cycle time, and piece cost. The fastening member both attaches the rail, and takes the place of traditional weld-on backing plates. The rail member is utilized as a structural member as well to distribute loading across all three attachment points.

The assembly in accordance with the present invention advantageously provides an assembly that can be releasably attached to the mounting surface of the vehicle body panel without requiring any further structural upgrade to the mounting surface. The assembly for mounting at least one component is cost and labor effective and user friendly for installation, service or repair.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
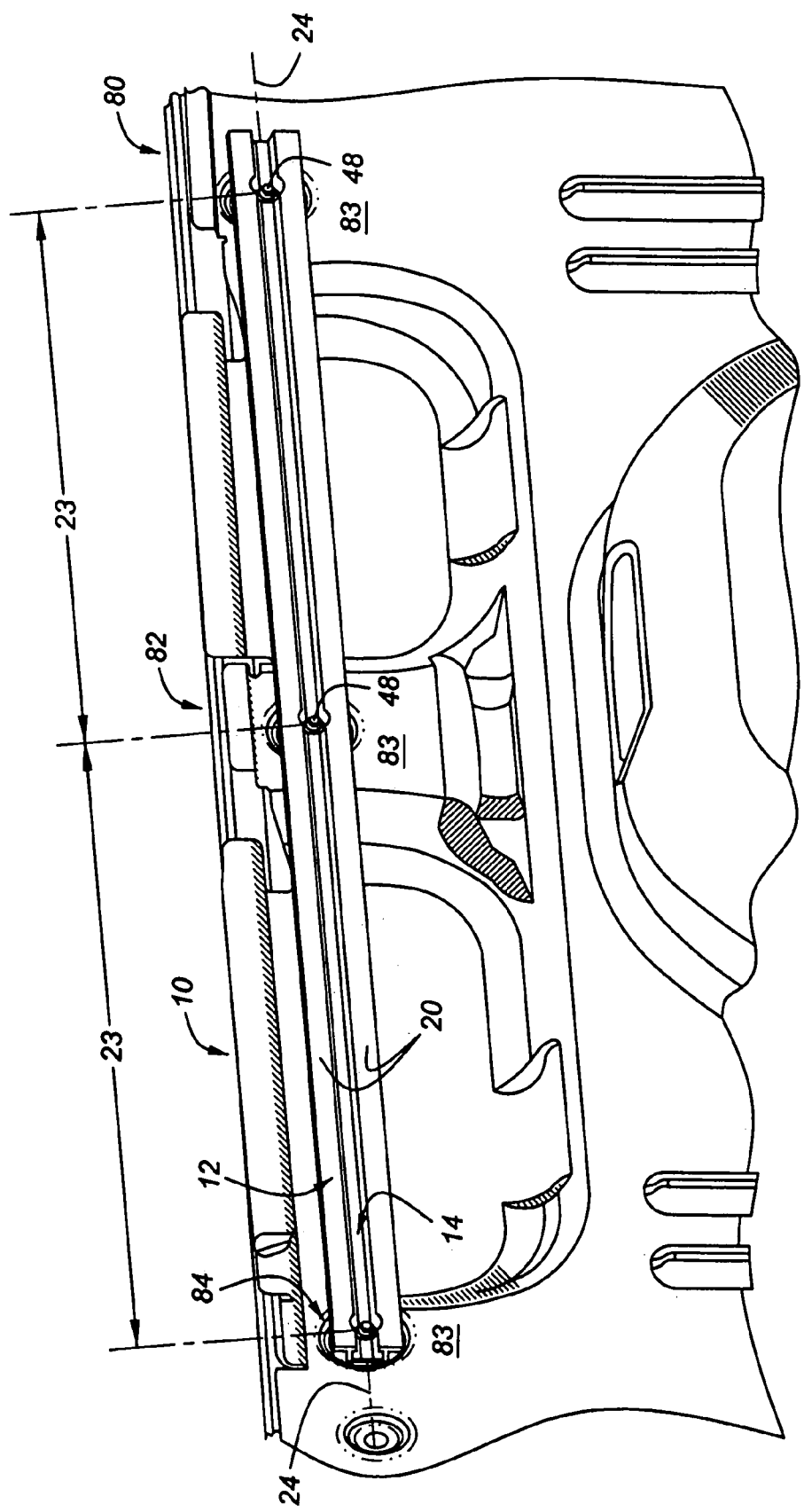
FIG. 1 is a fragmentary perspective view of an assembly for mounting at least one component thereto in accordance with the present invention.
Figure 2:
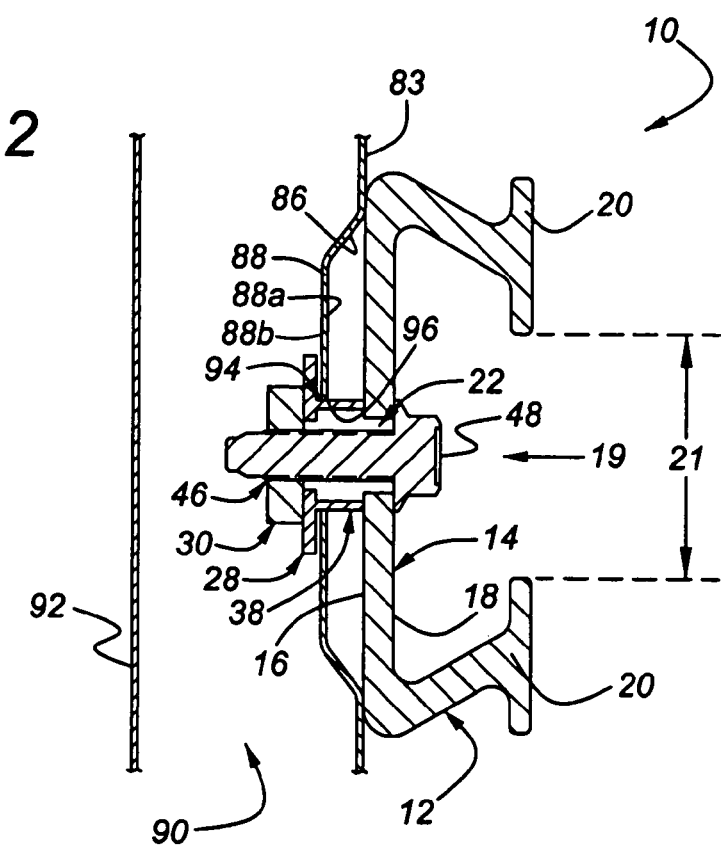
FIG. 2 is a cross-sectional view of the assembly of FIG. 1.
Figure 3:
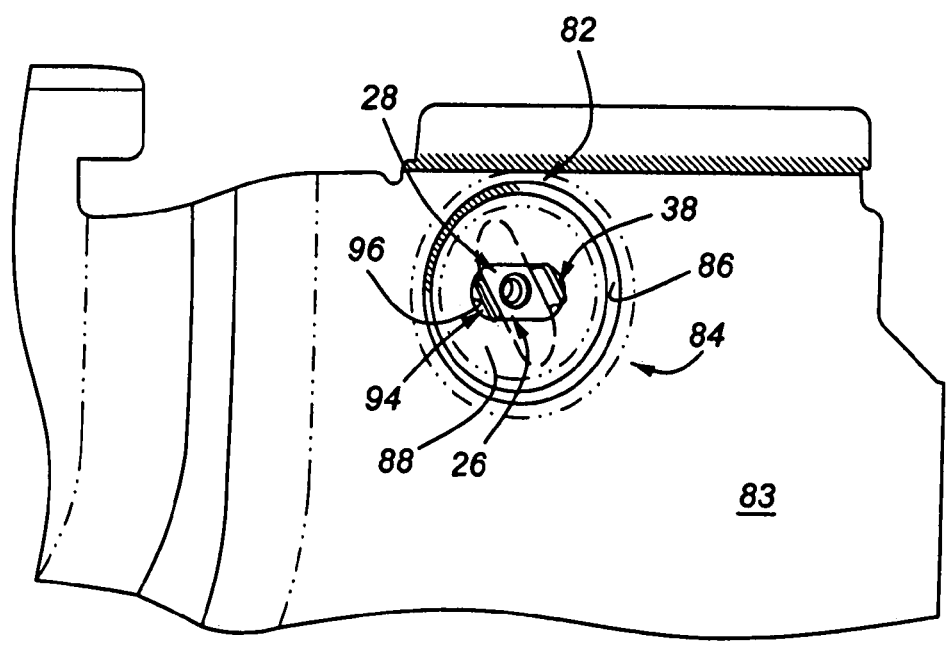
FIG. 3 is a fragmentary perspective view of a fastening member in accordance with the present invention shown installed in a mounting surface.
Figure 4:
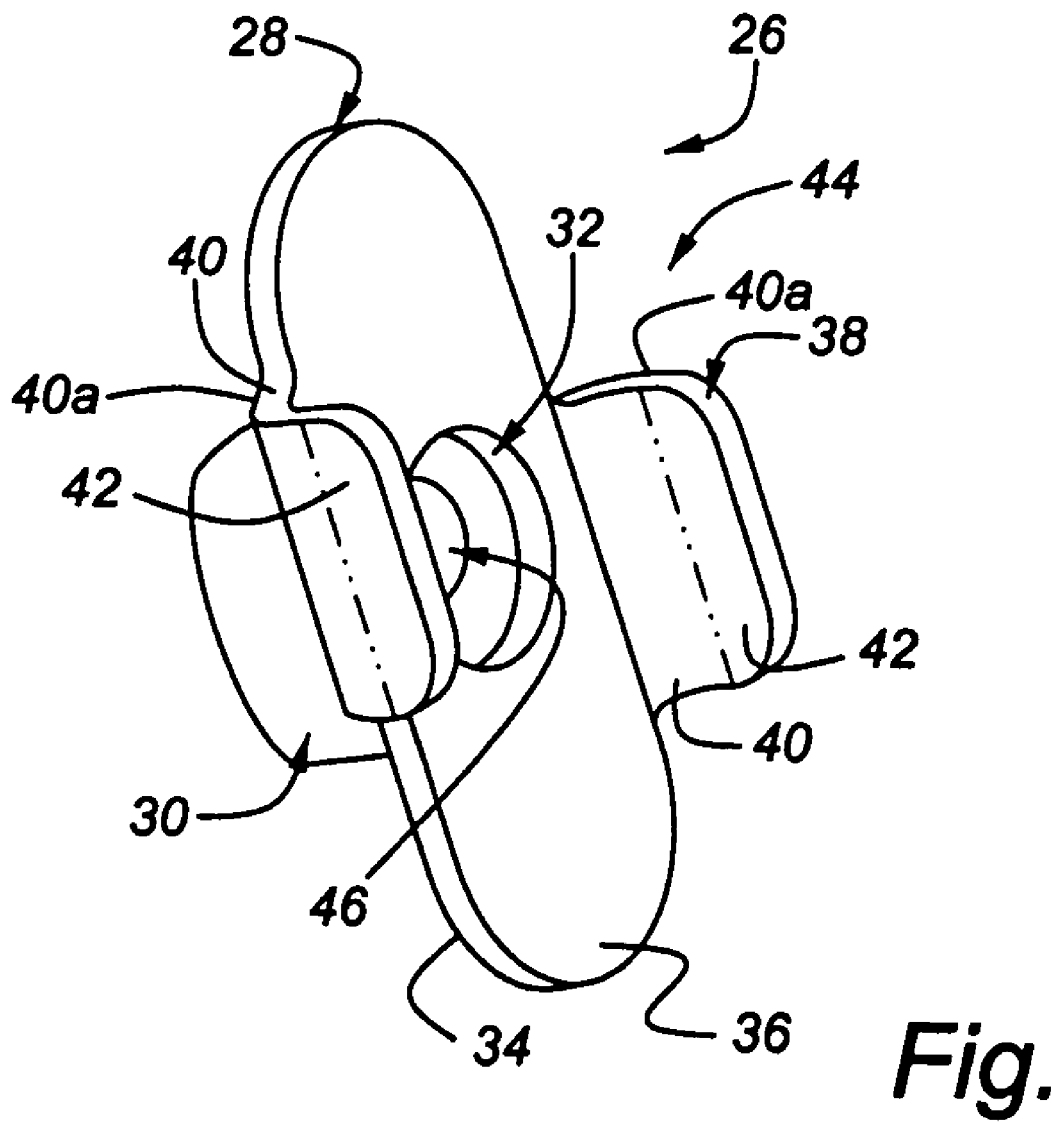
FIG. 4 is a perspective view of the fastening member of FIG. 3

Referring now to FIGS. 1 and 2, an assembly for mounting at least one component thereto in accordance with the present invention is indicated generally at 10. The assembly 10 includes a rail member 12 having a base portion 14 that includes a first side 16 and a second side 18. A pair of flanges 20 extends outwardly from the second side 18 of the base portion 14. The flanges 20 are preferably T-shaped in cross-section. A plurality of apertures 22 extend through the first side 16 and second side 18 of the base member 14. Each of the apertures 22 are preferably evenly spaced apart along the rail member 12 by a predetermined distance 23. Alternatively, the distances 23 may be chosen or varied according to the specific requirements for the assembly 10. Preferably, the rail member 12 is an elongated member along a longitudinal axis 24 thereof. Alternatively, the rail member 12 is formed of any length suitable for attaching components thereto, discussed in more detail below. The flanges 20 define a channel 19 therebetween and are spaced apart by a predetermined distance, indicated by an arrow 21.

Referring now to FIGS. 1–4, the assembly 10 also includes at least one fastening member, indicated generally at 26. The fastening member 26 includes a backing plate portion 28 and a fastener portion 30. The backing plate portion 28 of the fastening member 26 is formed in a substantially oval shape and includes an aperture 32 extending through an inner surface 34 and an outer surface 36 thereof. The outer surface 36 includes a pair of flanges 38 each having an outwardly extending portion 40 and an upwardly extending portion 42. The portions 40 form a retaining feature, indicated generally at 44, when the fastening member 26 is installed, discussed in more detail below. The fastener portion 30 extends downwardly from the inner surface 34 of the backing plate portion 28 and includes an aperture 46 extending therethrough and having threads formed on an interior surface thereof for receiving a bolt 48, best seen in FIGS. 1 and 2, or similar fastener when the fastening member 26 is installed. The bolt 48 is preferably an M8 bolt or the like, depending on the requirements of the assembly 10. A plurality of threads may also be formed on an interior surface defined by the aperture 32, as will be appreciated by those skilled in the art. The number of fastening members 26 for the assembly 10 corresponds to the number of apertures 22 formed in the rail member 12.

A vehicle, indicated generally at 80, includes at least one mounting location 82 on a vehicle body panel 83, such as a vertically extending sheet metal side surface of a pickup truck box or the like. The mounting location 82 on the vehicle body panel 83 is preferably defined by an indentation 84 that includes a sloped surface 86 that connects a mounting surface 88 with the body panel 83. The mounting surface 88 defines an inner surface 88a and an outer surface 88b. The mounting surface 88 defines a space 90 between the mounting surface 88 and a rear surface 92, such as a vehicle outer body panel or the like, best seen in FIG. 2. As will be appreciated by those skilled in the art, the mounting surface 88 may be an interior surface or an exterior surface of the vehicle 80. The mounting surface 88 includes at least one aperture 94 formed therein. The aperture 94 is defined by an edge 96 formed between the inner surface 88a and the outer surface 88b of the mounting surface 88. The apertures 94 correspond in number to the number of apertures 22 extending through the rail member 12 and are spaced apart by a distance that is substantially equal to the distance 23 that the apertures 22 are spaced apart on the rail member 12. The edge 96 adjacent the aperture 94 defines an area that is slightly larger than an area defined by the backing plate portion 28 of the fastening member 26 and is preferably formed in a shape similar to the shape of the backing plate portion 28 to allow the backing plate portion 28 to pass therethrough.

During installation of the assembly 10, the backing plate portion 28 of each of the fastening members 26 is inserted into a respective one of the apertures 94 in the mounting surface 88. After the backing plate portion 28 has passed through the aperture 94, the fastening member 26 is rotated such the flanges 38 come into contact with the edge 96 of the mounting surface 88. As the fastening member 26 is rotated relative to the mounting surface 88, a sloped lower surface 40a of the outwardly extending portions 40 of the retaining feature 44 of the flanges 38 gradually engages with the edge 96 of the mounting surface 88, retaining the fastening member 26 to the mounting surface 88, and the upwardly extending portions 42 of the flanges 38 extend beyond the inner surface 88a of the mounting surface 88. The retaining feature 44 advantageously allows the fastening member 26 to remain in place in the aperture 94 without requiring an additional tool or manual intervention to keep it in place while completing installation of the assembly 10. The free ends of the flanges 38 extend a distance from the mounting surface 88 approximately equal to the distance between the mounting surface 88 and the body panel 83.

After the fastening members 26 are installed in the apertures 94, the rail member 12 is placed on the body panel 83 with the apertures 22 located adjacent the mounting locations 82. When the respective apertures 22, 32, and 46 are aligned, the bolt 48 is inserted in each of the respective apertures 22, 32, and 46 and fastened to the fastener portion 30. The retaining feature 44 advantageously prevents the backing plate portion 28 from turning while the bolt 48 is being tightened. The first side 14 of the rail member 12 engages with the body panel 83 adjacent the indentations 84. The upwardly extending portions 42 of the flanges 38 act as a pillar to increase the stiffness of the connection between the rail member 12 and the mounting location 84 while tension is increased on the bolt 48 during installation. The retaining feature 44 also advantageously allows the fastening member 26 to remain in place in the aperture 94 if the rail member 12 is removed from the body panel 83, making the assembly 10 user friendly for installation, service or repair.

After each of the bolts 48 are tightened, the assembly 10 is installed and ready for use. The spaced T-shaped flanges 20 of the rail member 12 advantageously allow a component (not shown) such as, for example a sliding tool box, a cargo divider, a moveable cargo tie-down hook or the like, to be attached to an upper one of the flanges 20 and another component (not shown) to be attached to a lower one of the flanges 20. Alternatively, a component (not shown) may be adapted to be attached to each of the flanges 20, providing a robust and flexible assembly 10 for attaching components thereto.

Preferably, the assembly 10 includes at least one rail member 12. Of course, the assembly 10 may include a plurality of rail members, such as the rail member 12, adapted to be attached to the body panel 83 at various locations, such as on opposing sides of a pickup truck bed or the like.

Alternatively, while the backing plate portion 28 and the apertures 94 formed in the mounting surface 88 are illustrated as being substantially oval in shape, those skilled in the art will appreciate that the backing plate portion 28 and the apertures 94 may be formed in any shape advantageous for insertion and subsequent engagement with the mounting surface 88 for retaining the fastening member 28 to the mounting surface 88 and for mounting a component thereon.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. An assembly adapted to be releasably attached to a mounting surface on a body panel of an automotive vehicle for mounting at least one component thereto, comprising:
   at least one elongated rail member having a base portion that includes a first side adapted to be located adjacent to said mounting surface and an opposed second side, said rail member including a pair of spaced apart flanges extending outwardly from said second side of said base portion, said base portion including at least one aperture extending therethrough; and
   at least one fastening member adapted to be retained in said body panel by a retaining feature, said at least one fastening member including a backing plate portion having at least one flange extending therefrom and an aperture extending therethrough for receiving a fastener for releasably attaching said assembly to said mounting surface.

2. The assembly according to claim 1 wherein each of said flanges is substantially T-shaped.

3. The assembly according to claim 1 wherein said pair of flanges define a channel of a predetermined distance therebetween for receiving said at least one component.

4. The assembly according to claim 1 wherein said fastening member includes a fastener body portion having an aperture formed therethrough.

5. The assembly according to claim 1 wherein said at least one flange on said at least one fastening member includes an outwardly extending portion and an upwardly extending portion and said retaining feature is a sloped surface on said outwardly extending portion of said at least one flange adapted to engage with said mounting surface when said backing plate portion is rotated relative to said mounting surface.

6. The assembly according to claim 1 wherein said at least one rail member is a plurality of rail members.

7. An assembly for mounting at least one component to an automotive vehicle, comprising:

a plurality of mounting locations formed on a body panel of said automotive vehicle at least one elongated rail member having a base portion that includes a first side adapted to be located adjacent to said mounting locations and an opposed second side, said rail member including a pair of spaced apart flanges extending outwardly from said second side of said base portion, said base portion including a plurality of apertures extending therethrough; and at least one fastening member adapted to be retained in said body panel by a retaining feature, said at least one fastening member including a backing plate portion having at least one flange extending therefrom and an aperture extending therethrough for receiving a fastener for releasably attaching said assembly to a mounting surface.

8. The assembly according to claim 7 wherein each of said flanges is substantially T-shaped.

9. The assembly according to claim 7 wherein said pair of flanges define a channel of a predetermined distance therebetween for receiving said at least one component.

10. The assembly according to claim 7 wherein said fastening member includes a fastener body portion having an aperture formed therethrough.

11. The assembly according to claim 7 wherein said at least one flange on said at least one fastening member includes an outwardly extending portion and an upwardly extending portion and said retaining feature is a sloped surface on said outwardly extending portion of said at least one flange adapted to engage with said mounting surface when said backing plate portion is rotated relative to said mounting surface.

12. The assembly according to claim 7 wherein said at least one rail member is a plurality of rail members.

13. The assembly according to claim 7 wherein said mounting locations are a plurality of indentations formed in said body panel.

14. The assembly according to claim 13 wherein said indentations are defined by a sloped surface connecting said mounting surface with said body panel.

15. The assembly according to claim 7 wherein said apertures in said rail member correspond in number to a number of said mounting locations.

16. The assembly according to claim 7 wherein said plurality apertures are spaced apart along said rail member by a predetermined distance.

* * * * *